Oct. 12, 1926.

W. SEVILLE 1,602,508

FRICTION CLUTCH CONSTRUCTION

Filed March 7, 1925

Inventor.
William Seville
by Heard Smith & Tennant.
Attys.

Patented Oct. 12, 1926.

1,602,508

UNITED STATES PATENT OFFICE.

WILLIAM SEVILLE, OF HOPEDALE, MASSACHUSETTS, ASSIGNOR TO DRAPER CORPORATION, OF HOPEDALE, MASSACHUSETTS, A CORPORATION OF MAINE.

FRICTION-CLUTCH CONSTRUCTION.

Application filed March 7, 1925. Serial No. 13,707.

This invention relates to an improvement in a friction clutch construction such as is suitable for use for various purposes, such, for example, as the clutching and unclutching of a pulley to a shaft.

The object of the invention is to provide a simple and efficient construction in which when the parts are in clutching position, no end thrust will be exerted on the shaft or its bearings.

This and other objects and features of the invention will appear more fully from the accompanying description and drawings and will be particularly pointed out in the claims.

A preferred embodiment of the present invention is shown in connection with a driving pulley and the main shaft of a loom. The clutch is of the friction disk type wherein the clutching engagement takes place between the two substantially flat or disk-like surfaces. But it should be understood that the invention is not to be restricted by the use of the term "disk", but is applicable to any form of construction wherein two cooperating members are brought into frictional engagement by a relative movement longitudinally of the shaft.

Figure 1:
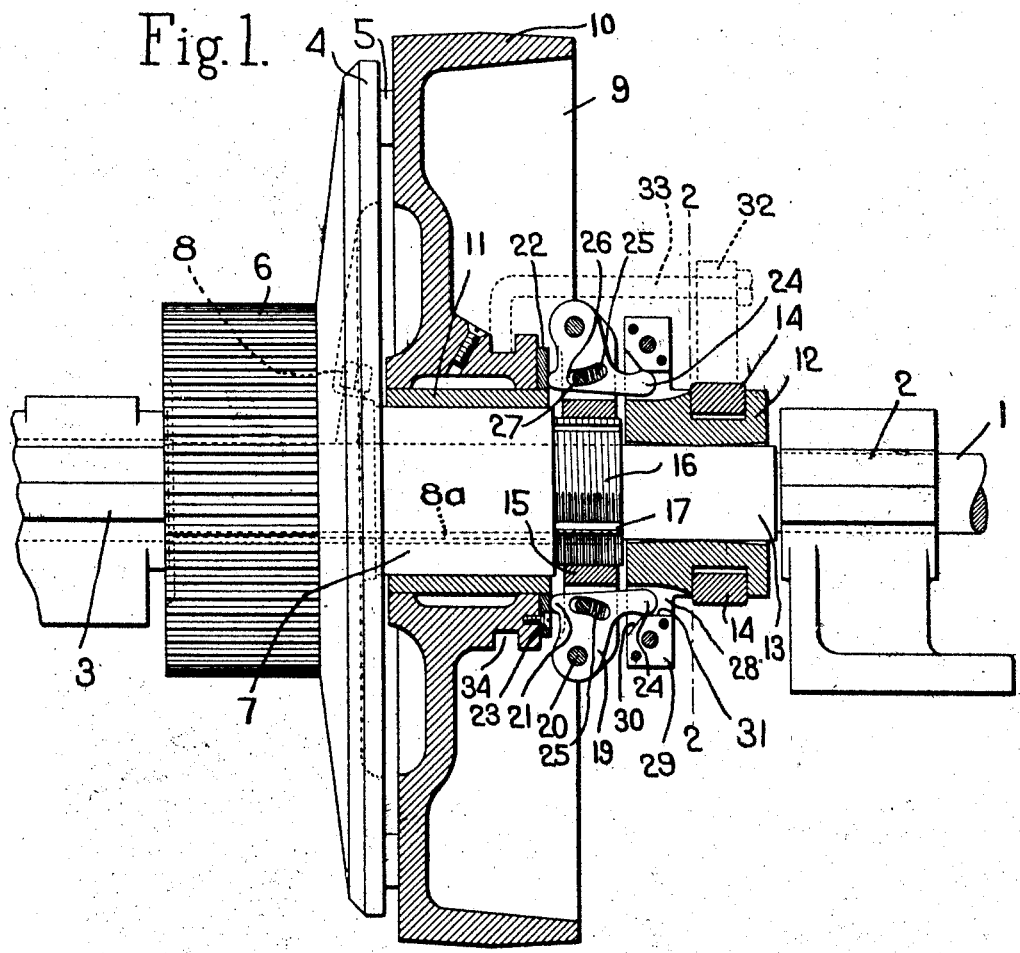
Fig. 1 is a view of the preferred form of the construction partially in elevation and partially in vertical cross section.
Figure 2:
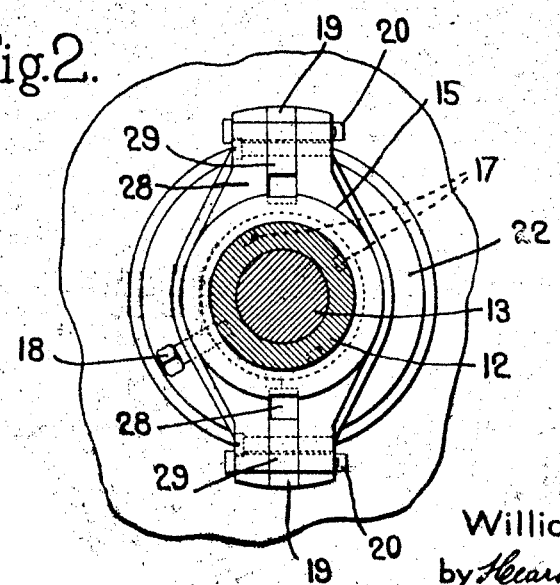
Fig. 2 is a view in transverse cross section taken on the line 2—2 of Fig. 1.

The shaft 1, which may be the driving shaft of a loom, is shown as supported in the separated bearings 2 and 3. The two cooperating clutch members are shown as a friction disk and a pulley. The friction disk 4 is provided on its surface with friction inserts 5. It is shown as having integral therewith a gear 6 and a hub 7 and is rigidly secured by a set screw 8 and a key 8ª to the shaft 1. The pulley 9 is flanged at its surface 10 to receive a driving belt and has a driving fit on a hub sleeve 11 mounted to rotate and slide on the hub 7 of the friction disk 4.

An actuator sleeve 12 is mounted on the section 13 of the shaft 1 and is provided with an annular groove in which is seated the forked end 14 of a usual actuating yoke or other device.

Between the pulley 9, which constitutes a friction member cooperating with the friction disk 4, and the actuator sleeve 12 a frame 15 is mounted upon an extended section 16 of the hub 7 of the friction disk 4. This frame is preferably longitudinally adjustable of the shaft to vary the force of the clutching action and provide for taking up wear. This longitudinal adjustment is preferably secured by threading the frame onto the section 16 of the hub 7. This threaded section 16 is provided at intervals with longitudinal grooves 17. A set screw 18 threaded radially into the frame 15 engages one of these grooves 17. Hence, by rotating the frame on the threaded section 16, it may be moved toward and from the friction disk 4 and then locked in any position of longitudinal adjustment by setting up the set screw 18 into one of the grooves 17.

The frame 15 has mounted therein a plurality of angularly spaced dogs 19 which are capable of moving toward and from the pulley or friction member 10. In the form illustrated, these dogs are shown as two in number and they are pivotally mounted at 20 at diametrically opposite positions in the frame so as to swing radially toward and from the friction member 10. Each dog at the side toward the friction member is provided with a nose 21 which seats against the annular hardened steel wear plate 22 secured by screws 23 to the pulley or friction member 10. Each dog is also preferably provided with a tail 24, extending axially in the opposite direction. Each dog also is normally moved or swung out of clutching engagement. For this purpose a helical spring 25 is shown seated in a slot 26 in the dog and abutting at one end a pin 27 secured in the frame and at the other end the dog itself.

Suitable means are provided on the actuator sleeve to move the dogs into clutching position and lock them in that position. In the preferred construction illustrated, the sleeve is provided with a cam-shaped recessed face to cooperate with the tails 24 of the dogs. The sleeve 12 is shown as provided with radially extending ears 28 in which are mounted wear plates 29, each presenting a cam-shaped face 30 and 31, the portion 30 of this face being inclined with respect to, and the portion 31 extending generally parallel with, the axis of the shaft. Thus, as is preferable, the actuator sleeve is kept from rotating with respect to the frame 15 by the engagement of the tails 24 between the ears 28.

The yoke 14 may be provided with an extension 32 having a hooked arm 33 extending over and engaging a groove 34 in the pulley hub so that when the actuator sleeve 12 is moved to unclutching position, the pulley may be positively moved to unclutching position.

The actuator sleeve 12 is also preferably formed so as to have a slight rocking movement longitudinally of the shaft. In the construction illustrated, the bore of the sleeve is formed slightly frusto-conical at each end so that the sleeve may rock about its middle section. This, as will be apparent, equalizes the pressure exerted by the sleeve upon the dogs and insures the equalization of the pressure between the cooperating clutching members.

The operation of the construction will now be apparent. The parts are shown in the drawing in clutched position. When the yoke 14 is moved to the right, the actuator sleeve 12 will move to the right, thus allowing the dogs 19 to swing readily away from the wear plate 22 under the action of the springs 25. This leaves the cooperating friction member or pulley 10 free to slide away from the friction disk 4 and this sliding movement will be insured if the hooked arm 33 is employed. The pulley 10 will now turn freely on the hub 7 and the shaft will not be rotated. When now it is desired to bring the parts into clutching engagement, the actuator sleeve 12 is moved, as by the yoke 14, to the left. The inclined face 30 thereupon acts upon the tails 24 of the dogs, swinging the dogs toward the pulley 10 and drawing the tails radially toward the center of the shaft 1. The frame 15 is so adjusted that when, upon the continued movement of the actuator sleeve 12, the tails 24 of the dogs slide into engagement with the portion 31 of the face of the sleeve, the dogs have been forced hard against the wear plate 22 and have crowded the cooperating friction member or pulley 10 into firm clutching engagement with the friction disk 4. But when the tails 24 of the dogs have slid into engagement with the surface 31 of the actuator sleeve 12, the dogs are locked in clutching engagement and it will be noted they are held thus locked by forces which are exerted radially of the shaft. Consequently there is no tendency, when the parts are in clutching position, to produce any end thrust on the shaft 1 or upon the bearings 2 or 3. The slight longitudinal rocking movement provided for between the actuator sleeve 12 and the shaft insures that these forces shall be exerted equally upon the dogs and that consequently the clutching pressure on the dogs shall also be exerted equally.

There is thus produced a very simple, practical and efficient construction for securing the clutching and unclutching action between the two friction members and one in which all danger of end thrust, when the parts are in clutching position, is obviated.

Having thus described the invention, what is claimed as new, and desired to be secured by Letters Patent, is:

1. A friction clutch comprising a shaft, a friction disk rigid with the shaft, a frame mounted concentrically of the shaft to rotate with the friction disk and shaft, means for adjusting the frame longitudinally of the shaft with respect to the friction disk, a cooperating friction member mounted to rotate and slide with respect to the shaft between the disk and the frame, an actuator sleeve mounted to slide on the shaft, a plurality of equiangularly spaced dogs movably mounted in the frame, the actuator sleeve being shaped to have a slight longitudinal rocking movement on the shaft to equalize the force exerted by it upon the dogs, and means on the actuator sleeve acting upon the clutching movement of the sleeve to move the dogs against the friction member and slide it into clutching engagement with the friction disk.

2. A friction clutch comprising a shaft, a friction disk rigid with the shaft, a frame rigidly secured with respect to the friction disk, a cooperating friction member mounted to rotate and slide with respect to the shaft between the disk and the frame, a plurality of equiangularly spaced dogs pivotally mounted in the frame to swing radially toward and from the friction member and provided with axially extended tails, and an actuator sleeve mounted on the shaft to slide longitudinally thereof and having cam-shaped slotted ears, the slots of which cooperate with said tails to cause the actuator sleeve to rotate with the frame, the actuator sleeve acting when slid axially toward the frame first to swing the dogs against the friction member and force it into clutching engagement with the disk and then to slide over the tails and hold the dogs in clutching position by forces exerted radially.

In testimony whereof, I have signed my name to this specification.

WILLIAM SEVILLE.